US009632976B2

(12) United States Patent
Rozas et al.

(10) Patent No.: US 9,632,976 B2
(45) Date of Patent: Apr. 25, 2017

(54) LAZY RUNAHEAD OPERATION FOR A MICROPROCESSOR

(71) Applicant: NVIDIA Corporation, Santa Clara, CA (US)

(72) Inventors: Guillermo J. Rozas, Los Gatos, CA (US); Alexander Klaiber, Mountain View, CA (US); James van Zoeren, Albuquerque, NM (US); Paul Serris, San Jose, CA (US); Brad Hoyt, Portland, OR (US); Sridharan Ramakrishnan, Hillsboro, OR (US); Hens Vanderschoot, Tigard, OR (US); Ross Segelken, Portland, OR (US); Darrell D. Boggs, Aloha, OR (US); Magnus Ekman, Alameda, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 877 days.

(21) Appl. No.: 13/708,645

(22) Filed: Dec. 7, 2012

(65) Prior Publication Data

US 2014/0164736 A1    Jun. 12, 2014

(51) Int. Cl.
| | | |
|---|---|---|
| G06F 11/00 | (2006.01) | |
| G06F 15/78 | (2006.01) | |
| G06F 9/30 | (2006.01) | |
| G06F 9/38 | (2006.01) | |
| G06F 11/07 | (2006.01) | |

(52) U.S. Cl.
CPC ........ *G06F 15/78* (2013.01); *G06F 9/30087* (2013.01); *G06F 9/3842* (2013.01); *G06F 11/0721* (2013.01); *G06F 11/0793* (2013.01)

(58) Field of Classification Search
CPC ................ G06F 11/0721; G06F 11/0793
See application file for complete search history.

(56) References Cited

U.S. PATENT DOCUMENTS

| | | |
|---|---|---|
| 5,487,146 A | 1/1996 | Guttag et al. |
| 5,721,855 A | 2/1998 | Hinton et al. |
| 5,864,692 A | 1/1999 | Faraboschi et al. |
| (Continued) | | |

FOREIGN PATENT DOCUMENTS

| | | |
|---|---|---|
| CN | 1519728 | 7/2004 |
| CN | 1629799 | 6/2005 |
| (Continued) | | |

OTHER PUBLICATIONS

Adve, S. et al., "Shared Memory Consistency Models: A Tutorial," WRL Research Report 95/7, Western Research Laboratory, Palo Alto, CA., Sep. 1995, 32 pages.
(Continued)

*Primary Examiner* — Zachary K Huson

(57) ABSTRACT

Embodiments related to managing lazy runahead operations at a microprocessor are disclosed. For example, an embodiment of a method for operating a microprocessor described herein includes identifying a primary condition that triggers an unresolved state of the microprocessor. The example method also includes identifying a forcing condition that compels resolution of the unresolved state. The example method also includes, in response to identification of the forcing condition, causing the microprocessor to enter a runahead mode.

20 Claims, 4 Drawing Sheets

(56) References Cited

U.S. PATENT DOCUMENTS

| | | | |
|---|---|---|---|
| 5,870,582 | A | 2/1999 | Cheong et al. |
| 5,956,753 | A | 9/1999 | Glew et al. |
| 6,037,946 | A | 3/2000 | Takeda |
| 6,519,694 | B2 | 2/2003 | Harris |
| 7,010,648 | B2 | 3/2006 | Kadambi et al. |
| 7,062,631 | B1 | 6/2006 | Klaiber et al. |
| 7,117,330 | B1 | 10/2006 | Alverson et al. |
| 7,194,604 | B2 | 3/2007 | Bigelow et al. |
| 7,293,161 | B1 | 11/2007 | Chaudhry et al. |
| 7,421,567 | B2 | 9/2008 | Eickemeyer et al. |
| 7,587,584 | B2 | 9/2009 | Enright et al. |
| 7,752,627 | B2 | 7/2010 | Jones et al. |
| 7,873,793 | B1 | 1/2011 | Rozas et al. |
| 7,890,735 | B2 | 2/2011 | Tran |
| 8,035,648 | B1 | 10/2011 | Wloka et al. |
| 8,707,011 | B1 | 4/2014 | Glasco et al. |
| 2003/0018685 | A1 | 1/2003 | Kalafatis et al. |
| 2003/0196010 | A1 | 10/2003 | Forin et al. |
| 2004/0128448 | A1 | 7/2004 | Stark et al. |
| 2005/0041031 | A1 | 2/2005 | Diard |
| 2005/0055533 | A1 | 3/2005 | Kadambi et al. |
| 2005/0138332 | A1 | 6/2005 | Kottapalli et al. |
| 2005/0154831 | A1 | 7/2005 | Steely et al. |
| 2006/0010309 | A1 | 1/2006 | Chaudhry et al. |
| 2006/0095678 | A1 | 5/2006 | Bigelow et al. |
| 2006/0149931 | A1 | 7/2006 | Haitham et al. |
| 2006/0174228 | A1 | 8/2006 | Radhakrishnan et al. |
| 2006/0212688 | A1 | 9/2006 | Chaudhry et al. |
| 2006/0277398 | A1 | 12/2006 | Akkary et al. |
| 2007/0074006 | A1 | 3/2007 | Martinez et al. |
| 2007/0174555 | A1 | 7/2007 | Burtscher et al. |
| 2007/0186081 | A1 | 8/2007 | Chaudhry et al. |
| 2007/0204137 | A1 | 8/2007 | Tran |
| 2009/0019317 | A1 | 1/2009 | Quach et al. |
| 2009/0327661 | A1 | 12/2009 | Sperber et al. |
| 2010/0199045 | A1 | 8/2010 | Bell et al. |
| 2010/0205402 | A1 | 8/2010 | Henry et al. |
| 2010/0205415 | A1 | 8/2010 | Henry et al. |
| 2012/0023359 | A1 | 1/2012 | Edmeades et al. |
| 2012/0089819 | A1 | 4/2012 | Chaudhry et al. |
| 2013/0124829 | A1 | 5/2013 | Chou et al. |
| 2014/0082291 | A1 | 3/2014 | Van Zoeren et al. |
| 2014/0122805 | A1* | 5/2014 | Ekman ............... G06F 9/30189 711/122 |
| 2014/0136891 | A1 | 5/2014 | Van Zoeren et al. |
| 2014/0164738 | A1 | 6/2014 | Ekman et al. |
| 2014/0281259 | A1 | 9/2014 | Klaiber et al. |
| 2015/0026443 | A1 | 1/2015 | Kumar et al. |

FOREIGN PATENT DOCUMENTS

| | | |
|---|---|---|
| CN | 1831757 | 9/2006 |
| CN | 102184127 | 9/2011 |
| CN | 103793205 | 5/2014 |
| DE | 102013218370 A1 | 3/2014 |
| EP | 0671718 | 9/1995 |
| GB | 2287111 | 9/1995 |
| TW | 200405201 | 4/2004 |
| TW | 200529071 | 9/2005 |
| TW | 1263938 | 10/2006 |
| TW | 1275938 | 3/2007 |
| TW | 200809514 | 2/2008 |
| TW | 1315488 | 10/2009 |
| TW | 201032627 | 9/2010 |
| TW | 201112254 | 4/2011 |
| TW | 1425418 | 2/2014 |
| TW | I536167 | 6/2016 |

OTHER PUBLICATIONS

Dundas, J. et al., "Improving Data Cache Performance by Pre-executing Instructions Under a Cache Miss," The University of Michigan, Ann Arbor, MI., Jul. 7-11, 1997, 8 pages.

Mutlu, O. et al., "Runahead Execution: An Alternative to Very Large Instruction Windows for Out-of-order Processors," International Symposium on High-Performance Computer Architecture, Anaheim, CA.,Feb. 8-12, 2003, 12 pages.

"Intel Itanium Architecture Software Developer's Manual", Intel, http://www.intel.com/design/itanium/manuals/iiasdmanual.htm, 1 page, May 2010.

Ekman, M. et al., "Instruction Categorization for Runahead Operation", U.S. Appl. No. 13/708,544, filed Dec. 7, 2012, 32 pages.

Holmer, B. et al., "Managing Potentially Invalid Results During Runahead", U.S. Appl. No. 13/677,085, filed Nov. 14, 2012, 29 pages.

Ekman, M. et al., "Selective Poisoning of Data During Runahead", U.S. Appl. No. 13/662,171, filed Oct. 26, 2012, 33 pages.

Altera-"Implementing a Queue Manager in Traffic Management Systems", Feb. 2004, "pp. 1-8".

Chaudry, S. et al., "High-Performance Throughput Computing," Micro, IEEE 25.3, pp. 32-45, May, 2005, 14 pages.

Dehnert, et al., The Transmeta Code Morphing Software: using speculation, recovery, and adaptive retranslation to address real-life challenges, Mar. 23, 2003, IEEE, CGO '03 Proceedings of the international symposium on Code generation and optimization: feedback-directed and runtime optimization, pp. 15-24.

Wikipedia article, "x86," https://en.wikipedia.org/wiki/X86, downloaded May 23, 2016.

Rozas, Guillermo J. et al., "Queued Instruction Re-Dispatch After Runahead," U.S. Appl. No. 13/730,407, Filed Dec. 28, 2012, 36 pages.

Rozas, J. et al., "Lazy Runahead Operation for a Microprocessor", U.S. Appl. No. 13/708,645, Filed Dec. 7, 2012, 32 pages.

Wikipedia article, "Instruction Prefetch," https://en.wikipedia.org/wiki/Instruction_prefetch, downloaded May 23, 2016.

* cited by examiner

LAZY RUNAHEAD OPERATION FOR A MICROPROCESSOR

BACKGROUND

Instructions in microprocessors are often re-dispatched for execution one or more times due to pipeline errors or data hazards. For example, an instruction may need to be re-dispatched when an instruction refers to a value not present in the cache (e.g., a cache miss). Because it is not known whether other unpredicted stalls will arise due to other misses during resolution of that cache miss, the microprocessor may perform a runahead operation configured to detect other misses while the initial miss is being resolved. However, the calculations performed during runahead are often invalidated and repeated. Repeating these calculations after re-entry into normal operation mode may diminish microprocessor performance.

DETAILED DESCRIPTION

Figure 1:
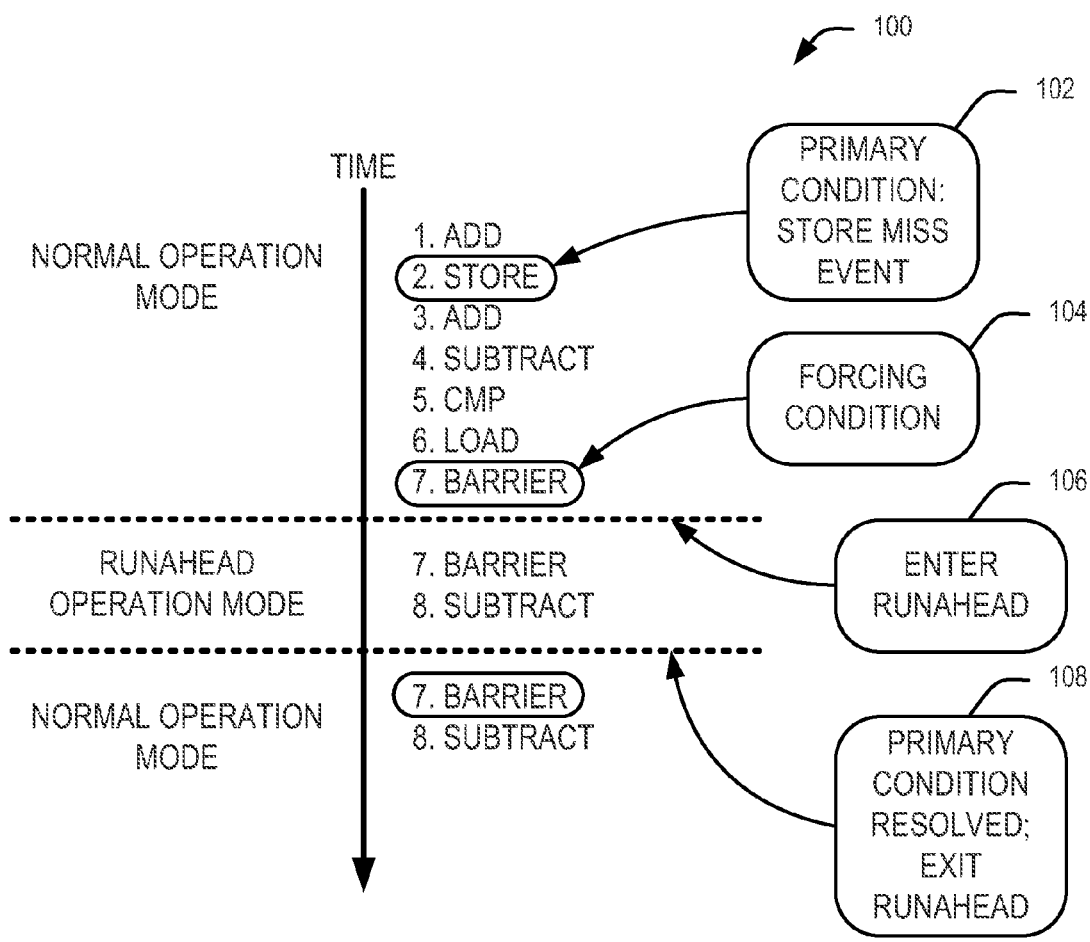
FIG. 1 schematically shows an example of lazy runahead operation according to an embodiment of the present disclosure.

In modern microprocessors, architectural-level instructions are often executed in a pipeline. Such instructions may be issued individually or as bundles of micro-operations to various execution mechanisms in the pipeline. Regardless of the form that an instruction takes when issued for execution, when the instruction is issued, it is not known whether execution of the instruction will complete or not. Put another way, it is not known at dispatch whether a miss or an exception will arise during execution of the instruction.

A common pipeline execution stall that may arise during execution of an instruction is a store operation that results in a store miss. Put another way, a stall may result from a store request where there is no permission to store in the requested cache line (e.g., in a cache line having shared state, such as in a memory system shared by a plurality of processing units included in a microprocessor) or where the requested cache line is not present. Such store misses may trigger an entrance into a runahead mode of operation (hereafter referred to as "runahead") that is configured to detect, for example, other cache misses (e.g., store misses and/or load misses), instruction- and/or data-translation lookaside buffer misses, or branch mispredicts while the store load miss is being resolved.

As used herein, runahead describes any suitable speculative execution scheme performed during a long-latency event that triggers an unresolved state in the microprocessor. It will be appreciated that the nature and identity of such long-latency events may vary. Another example of such events is a load miss where the resulting load event pulls the missing instruction or data from a slower access memory location. Also, some long-latency floating point operations, such as some denormal square root operations, may be configured to trigger a runahead mode. Once the runahead-triggering event is detected, the state of the microprocessor (e.g., the registers and other suitable states) may be checkpointed so that the microprocessor may return to that state after runahead. The microprocessor then continues executing in a working state during runahead. After the initial long-latency event is resolved, the microprocessor exits runahead and normal operation resumes.

In some settings, the microprocessor may enter runahead immediately upon detection of a long-latency event. However, some microprocessors may be able to operate in a normal mode after an event that would otherwise trigger runahead. For example, it may be possible to operate some microprocessors utilizing a somewhat relaxed memory consistency model in normal mode for a limited time even after the occurrence of a store miss or other suitable event that triggers an unresolved state in the microprocessor. Similarly, some microprocessors implementing a sequential consistency model via a transactional memory system may continue executing past a store miss in normal mode so long as the transaction is not committed until after store permission is received.

Because runahead operation is a speculative execution scheme, the values resulting from runahead operation are typically invalid and are discarded on re-entry to normal operation after runahead. Thus, it may speed execution of the instructions to avoid entry into runahead in some circumstances. For example, if the potential time savings that may be realized by uncovering other long-latency events does not offset the time cost of re-executing the instructions, it may be desirable to avoid or delay entering runahead. However, while entry into runahead may be delayed for a while, a stall or exception may result if at some point the microprocessor attempts to use or access the missing data while the state triggered by the long-latency event is unresolved. In such situations, it may be desirable to enter runahead operation. Unfortunately, it may be hard to determine when to enter runahead and avoid the exception because the instruction initially triggering the unresolved state may be long gone.

Accordingly, the embodiments described herein relate to methods and hardware configured to manage entry and exit of a microprocessor into a runahead mode in response to a forcing condition that compels resolution of an unresolved state triggered by a primary condition occurring prior to instantiation of the runahead mode. For example, an embodiment of a method for operating a microprocessor described herein includes identifying a primary condition that triggers an unresolved state of the microprocessor. As used herein, a primary condition refers to a condition that triggers a long-latency event at the microprocessor, where the long-latency event may remain unresolved while the microprocessor continues to operate in a normal operation mode. Put another way, a primary condition is a condition that allows a delayed, lazy entry into runahead instead of causing a prompt, eager entry into runahead. It will be appreciated that primary conditions may vary according to architectural specifics of the microprocessor. Non-limiting examples of primary conditions include store misses and long-latency and/or dynamic-latency floating point operations. In some embodiments, a load miss may be a primary condition.

The example method also includes identifying a forcing condition that compels resolution of the unresolved state. As used herein, a forcing condition refers to a condition that, upon occurrence, causes the microprocessor to stall if the primary condition is unresolved. For example, encountering a barrier instruction configured to order/synchronize microprocessor operation may trigger a stall while awaiting resolution of a store miss. Such barrier instructions may be used with relaxed memory consistency model microprocessors. In this example, the store miss would be the primary condition and the barrier operation would be the forcing condition. As another example, a long-latency floating point operation may be encountered; in this example, the operation may be considered the primary condition. Encountering a request for a use of a result of that long-latency floating point operation (e.g., in a subsequent floating point operation) may be the forcing condition. In yet another example, a load miss may be encountered (in this example, the primary condition), though runahead may be delayed until an attempt to use the loaded data is made (the forcing condition in this example). It will be appreciated that a forcing condition may be related to a plurality of primary conditions in some embodiments. In other words, the occurrence of a particular forcing condition may compel resolution of one or more or all of the primary conditions related to that forcing condition.

The example method also includes, in response to identification of the forcing condition, causing the microprocessor to enter a runahead mode. Thus, instead of stalling the microprocessor upon identification of the forcing condition, the microprocessor enters a runahead mode. As a result, the microprocessor may enter runahead in a lazy fashion, so that the microprocessor may continue to operate in normal mode past an event that triggers an unresolved state until resolution of that state is compelled by the forcing event. Accordingly, delaying entry into runahead may allow the microprocessor to perform those calculations that may be completed, so that the results of those calculations may not be lost, as might occur with prompt entry into runahead. Once those calculations are completed, the microprocessor may then enter runahead to resolve one or more runahead-triggering events, which may enhance performance. Further, in some embodiments the microprocessor may operate in runahead mode until the unresolved state becomes resolved, at which time the microprocessor may exit runahead and return to normal operation. Consequently, the microprocessor may spend less time in runahead compared to microprocessors that immediately enter runahead upon the occurrence of a condition that triggers an unresolved state.

FIG. 1 schematically shows an example operation scheme 100 depicting lazy runahead operation of a program comprising instructions 1-8 at a microprocessor. At 102, a store miss event occurs, the store miss event being identified as a primary condition. Instead of immediately entering runahead mode, however, the microprocessor continues to operate in normal mode, even though the store miss remains unresolved, until a barrier event is encountered at 104. The occurrence of the barrier event compels resolution of the store miss, and so, at 106, the microprocessor enters a runahead mode of operation. The microprocessor operates in runahead mode until the store miss is resolved at 108, when the microprocessor re-enters normal mode by replaying the barrier instruction. In some settings, delaying entry into runahead in this lazy fashion may enhance performance relative to examples where runahead commences at the occurrence of the store miss event. As shown in FIG. 1, at least a portion of the time spent resolving the store miss occurred during normal mode, so that the results of calculations performed during normal mode are not invalidated during restart after runahead.

Figure 2:
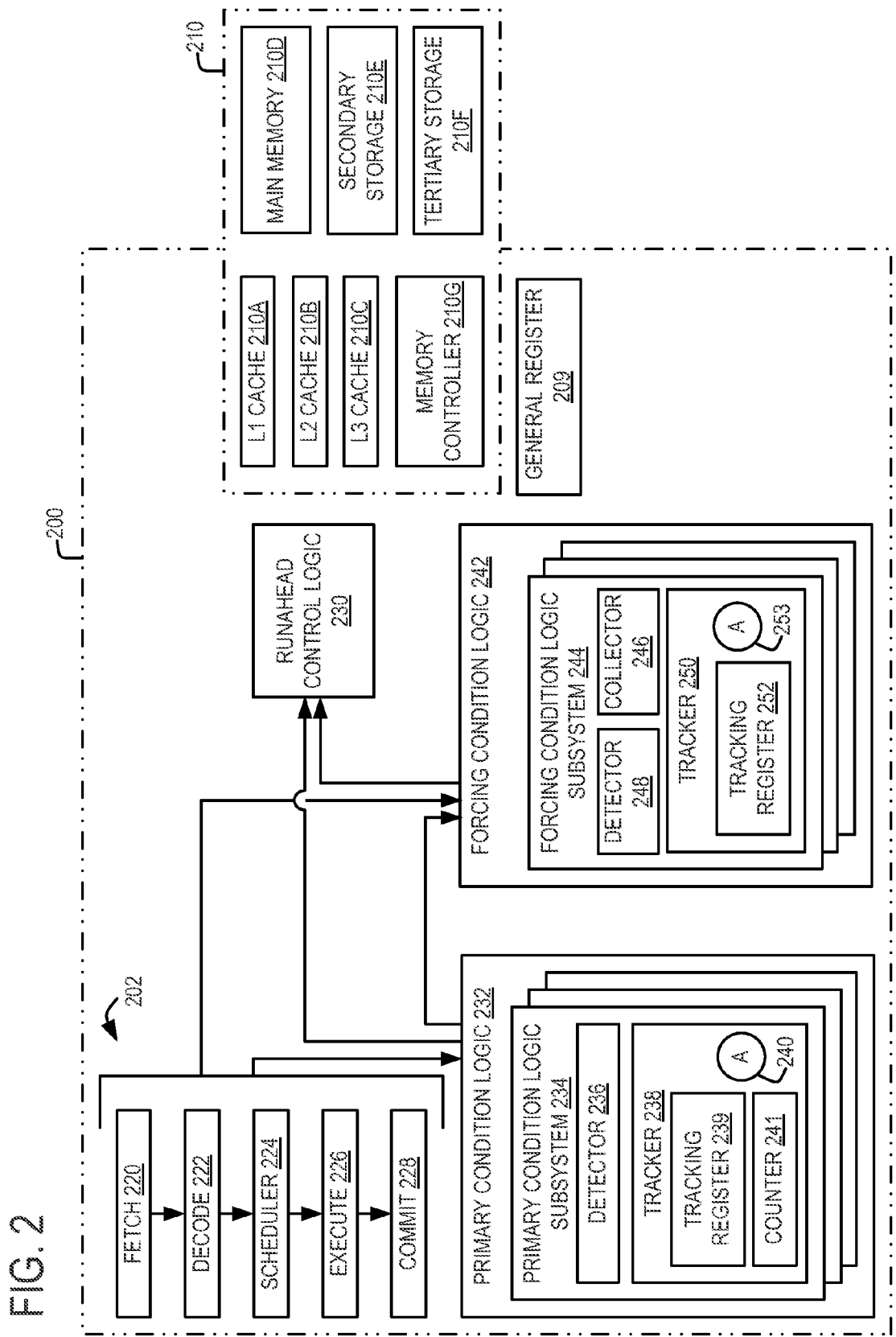
FIG. 2 schematically shows a microprocessor according to an embodiment of the present disclosure.

FIG. 2 schematically depicts an embodiment of a microprocessor 200 that may be employed in connection with the systems and methods described herein. Microprocessor 200 variously includes processor registers 209 and may also include a memory hierarchy 210, which may include an L1 processor cache 210A, an L2 processor cache 210B, an L3 processor cache 210C, main memory 210D (e.g., one or more DRAM chips), secondary storage 210E (e.g., magnetic and/or optical storage units) and/or tertiary storage 210F (e.g., a tape farm). It will be understood that the example memory/storage components are listed in increasing order of access time and capacity, though there are possible exceptions.

A memory controller 210G may be used to handle the protocol and provide the signal interface required of main memory 210D and to schedule memory accesses. The memory controller can be implemented on the processor die or on a separate die. It is to be understood that the memory hierarchy provided above is non-limiting and other memory hierarchies may be used without departing from the scope of this disclosure.

Microprocessor 200 also includes a pipeline, illustrated in simplified form in FIG. 2 as pipeline 202. Pipelining may allow more than one instruction to be in different stages of retrieval and execution concurrently. Put another way, a set of instructions may be passed through various stages included in pipeline 202 while another instruction and/or data is retrieved from memory. Thus, the stages may be utilized while upstream retrieval mechanisms are waiting for memory to return instructions and/or data, engaging various structures such as caches and branch predictors so that other cache misses and/or branch mispredicts may potentially be discovered. This approach may potentially accelerate instruction and data processing by the microprocessor relative to approaches that retrieve and execute instructions and/or data in an individual, serial manner.

As shown in FIG. 2, pipeline 202 includes fetch logic 220, decode logic 222, scheduling logic 224, execution logic 226, and commit logic 228. Fetch logic 220 retrieves instructions from the memory hierarchy 210, typically from either unified or dedicated L1 caches backed by L2-L3 caches and main memory. Decode logic 222 decodes the instructions, for example by parsing opcodes, operands, and addressing modes. Upon being parsed, the instructions are then scheduled by scheduling logic 224 for execution by execution logic 226.

In some embodiments, scheduling logic 224 may be configured to schedule instructions for execution in the form of instruction set architecture (ISA) instructions. Additionally or alternatively, in some embodiments, scheduling logic 224 may be configured to schedule bundles of micro-operations for execution, where each micro-operation corresponds to one or more ISA instructions or parts of ISA instructions. It will be appreciated that any suitable arrangement for scheduling instructions in bundles of micro-operations may be employed without departing from the scope of the present disclosure. For example, in some embodiments, a single instruction may be scheduling in a plurality of bundles of micro-operations, while in some embodiments a single instruction may be scheduling as a bundle of micro-operations. In yet other embodiments, a plurality of instructions may be scheduling as a bundle of micro-operations. In still other embodiments, scheduling logic 224 may schedule individual instructions or micro-operations, e.g., instructions or micro-operations that do not comprise bundles at all.

As shown in FIG. 2, the depicted embodiment of pipeline 202 includes execution logic 226 that may include one or more execution mechanism units configured to execute instructions issued by scheduling logic 224. Any suitable number and type of execution mechanism units may be included within execution logic 226. Once processed by execution logic 226, completed instructions may be stored in preparation for commitment by commit logic 228. Commit logic 228 alters the architectural state of microprocessor 200 by committing completed instructions to memory. Put another way, commit logic 228 performs writeback functionality for microprocessor 200.

The embodiment of microprocessor 200 shown in FIG. 2 depicts runahead control logic 230. Runahead control logic 230 controls entry to and exit from runahead mode for microprocessor 200. In some embodiments, runahead control logic 230 may also control memory operations related to entry and exit from runahead. For example, on entry to runahead, portions of microprocessor 200 may be checkpointed to preserve the state of microprocessor 200 while a non-checkpointed working state version of microprocessor 200 speculatively executes instructions during runahead. In some of such embodiments, runahead control logic 230 may restore microprocessor 200 to the checkpointed state on exit from runahead.

The embodiment of microprocessor 200 shown in FIG. 2 also includes primary condition logic 232 configured to identify a primary condition that triggers an unresolved state in the microprocessor. While the embodiment shown in FIG. 2 depicts primary condition logic 232 as an entity separate from other portions of microprocessor 200 for clarity, it will be appreciated that some or all of the functions of primary condition logic 232 may be distributed among suitable portions of microprocessor 200.

It will be appreciated that primary condition logic 232 may track any suitable number of primary conditions. In the embodiment shown in FIG. 2, primary condition logic 232 includes one or more primary condition logic subsystems 234 that detect and track various primary conditions. For example, in some embodiments, each primary condition logic subsystem 234 may detect and track a particular primary condition (e.g., based on an identifier) or a particular type of primary condition. Further, in some embodiments, each primary condition logic subsystem 234 may have a preselected primary condition or primary condition type with which it is associated. Alternatively, in some embodiments, primary condition logic 232 may perform all of the functions of individual primary condition logic subsystems 234, so that primary condition logic subsystems 234 are omitted.

As shown, primary condition logic subsystem 234 includes a primary condition detector 236, a primary condition tracker 238, a primary condition tracking register 239, a primary condition active status bit 240, and a counter 241.

As shown in FIG. 2, primary condition logic 232 operatively communicates with pipeline 202, so that primary condition logic 232 may receive microprocessor event information from portions of pipeline 202. It will be understood that primary condition logic 232 may be in operative communication with any suitable portion of microprocessor 200. In some embodiments, primary condition logic 232 may receive microprocessor event information from other portions of microprocessor 200 via operative communication links not shown in FIG. 2.

Primary condition detector 236 is configured to detect and identify a primary condition. For example, primary condition detector 236 may filter microprocessor events obtained from a load/store unit to identify a predetermined primary condition such as a store miss. Upon detection of the primary condition, primary condition logic subsystem 234 is operative to send a primary condition signal to forcing condition logic 242 (described below) and to cause primary condition tracker 238 to start tracking the primary condition. In some embodiments, primary condition tracker 238 may track the primary condition using information about the microprocessor event related to the primary condition as detected via event filtration. For example, primary condition tracking register 239 may comprise a register configured to store information about the primary condition such as a primary condition identifier (e.g., a transaction identifier, a cache location identifier, or a pointer identifier) or a primary condition type (e.g., a store miss, a floating point operation, etc.).

In some embodiments, primary condition logic subsystem 234 may track resolution of the primary condition via active status bit 240. For example, upon detection of the primary condition, primary condition logic subsystem 234 may set active status bit 240 to indicate that a particular primary condition is actively being tracked. Once the primary condition is resolved, primary condition logic active status bit 240 may be set to indicate an inactive status.

In some embodiments, primary condition logic subsystem 234 may track resolution of one or more primary conditions via a counter 241. For example, the occurrence of a store miss may increase a value held in counter 241, while resolution of a store miss may decrease the value held in counter 241. In turn, microprocessor 200 may enter runahead if the value held in counter 241 exceeds a preselected threshold value when a related forcing condition is encountered. It will be appreciated that, if included, counter 241 may be configured to track a single type of primary condition and/or may be configured to track a plurality of types of primary conditions concurrently. While the embodiment shown in FIG. 2 depicts counter 241 as being included within primary condition logic subsystem 234, it will be appreciated that the functionality provided by counter 241 may be included in any suitable portion of microprocessor 200 (e.g., forcing condition logic 242, runahead control logic 230, etc.) and/or may be distributed among various portions of microprocessor 200 described herein.

As shown in FIG. 2, primary condition logic 232 is in operative communication with forcing condition logic 242. While the embodiment shown in FIG. 2 depicts forcing condition logic 242 as an entity separate from other portions of microprocessor 200 for clarity, it will be appreciated that some or all of the functions of forcing condition logic 242 may be distributed among suitable portions of microprocessor 200.

Forcing condition logic 242 is configured to receive a primary condition signal from primary condition logic 232. In some embodiments, the primary condition signal may include information about the primary condition, such as an event type or a primary condition identifier. Such information may assist the forcing condition logic with tracking the primary condition. Alternatively, in some embodiments, the primary condition logic may be an on/off signal.

As shown in FIG. 2, forcing condition logic 242 also operatively communicates with pipeline 202 to receive microprocessor event information related to the forcing condition from suitable portions of pipeline 202. It will be understood that forcing condition logic 242 may also be in operative communication with any suitable portion of microprocessor 200 to receive microprocessor event information related to the forcing condition. In some embodiments, forcing condition logic 242 may receive microprocessor event information from other portions of microprocessor 200 via operative communication links not shown in FIG. 2.

In the depicted embodiment, forcing condition logic 242 includes one or more forcing condition logic subsystems 244. Forcing condition logic subsystem 244 is configured to monitor and, in some embodiments, track one or more primary conditions and to identify a forcing condition that compels resolution of the unresolved state for those primary conditions. It will be appreciated that forcing condition logic 242 may track any suitable number of forcing conditions and monitor any suitable number of primary conditions in any suitable way. In some embodiments, each forcing condition logic subsystem 244 may detect a forcing condition and monitor a particular primary condition (e.g., based on an identifier) or a particular type of primary condition. Further, in some embodiments, each forcing condition logic subsystem 244 may have a preselected forcing condition or forcing condition type with which it is associated. Alternatively, in some embodiments, forcing condition logic 242 may perform all of the functions of individual forcing condition logic subsystems 244, so that forcing condition logic subsystems 244 are omitted.

In the embodiment shown in FIG. 2, forcing condition logic subsystem 244 includes a primary condition collector 246, a forcing condition detector 248, a forcing condition tracker 250, a forcing condition tracking register 252, and a forcing condition active status bit 253. Primary condition collector 246 receives primary condition signals received from primary condition logic 232. In some embodiments where a single primary condition signal is received, primary condition collector 246 may be a wire-like connection. In some embodiments where a plurality of primary condition signals are received, primary condition collector 246 may include logic adapted to determine when preselected primary condition criteria are met. For example, primary condition collector 246 may implement logic so that each of a plurality of primary conditions is received prior to enabling the forcing condition detector. Such logic may represent conditions that, if present, would cause the microprocessor to stall upon the occurrence of the forcing condition. Thus, if the conditions are not all present when the forcing condition occurs, the microprocessor may not stall and runahead may be avoided, potentially speeding operation.

Forcing condition detector 248 identifies a forcing condition from microprocessor event information. For example, forcing condition detector 248 may filter microprocessor events obtained from scheduling logic 224 to identify a forcing event associated with a primary condition. In one non-limiting example, a barrier event associated with a store miss event may result in the identification of a forcing condition. Upon identification of the forcing condition and receipt of the primary condition signal, forcing condition logic subsystem 244 sends a runahead condition signal to runahead control logic 230 so that microprocessor 200 may enter runahead.

In some embodiments, forcing condition tracker 250 may track the primary condition using information about the microprocessor event related to the primary condition being tracked. For example, forcing condition tracking register 252 may store a primary condition identifier (e.g., a transaction identifier, a cache location identifier, or a pointer identifier) or a primary condition type (e.g., a store miss, a floating point operation, etc.) received with a primary condition signal.

In some embodiments, forcing condition logic subsystem 244 may track resolution of the primary condition via active status bit 253. For example, upon receipt of a primary condition signal, forcing condition logic subsystem 244 may set active status bit 253 to indicate that a particular primary condition is unresolved.

It will be understood that the above stages shown in pipeline 202 are illustrative of a typical RISC implementation, and are not meant to be limiting. For example, in some embodiments, the fetch logic and the scheduling logic functionality may be provided upstream of a pipeline, such as compiling VLIW instructions or code-morphing. In some other embodiments, the scheduling logic may be included in the fetch logic and/or the decode logic of the microprocessor. More generally a microprocessor may include fetch, decode, and execution logic, each of which may comprise one or more stages, with mem and write back functionality being carried out by the execution logic. The present disclosure is equally applicable to these and other microprocessor implementations, including hybrid implementations that may use VLIW instructions and/or other logic instructions.

In the described examples, instructions may be fetched and executed one at a time, possibly requiring multiple clock cycles. During this time, significant parts of the data path may be unused. In addition to or instead of single instruction fetching, pre-fetch methods may be used to enhance performance and avoid latency bottlenecks associated with read and store operations (e.g., the reading of instructions and loading such instructions into processor registers and/or execution queues). Accordingly, it will be appreciated that any suitable manner of fetching, scheduling, and dispatching instructions may be used without departing from the scope of the present disclosure.

Figure 3A:
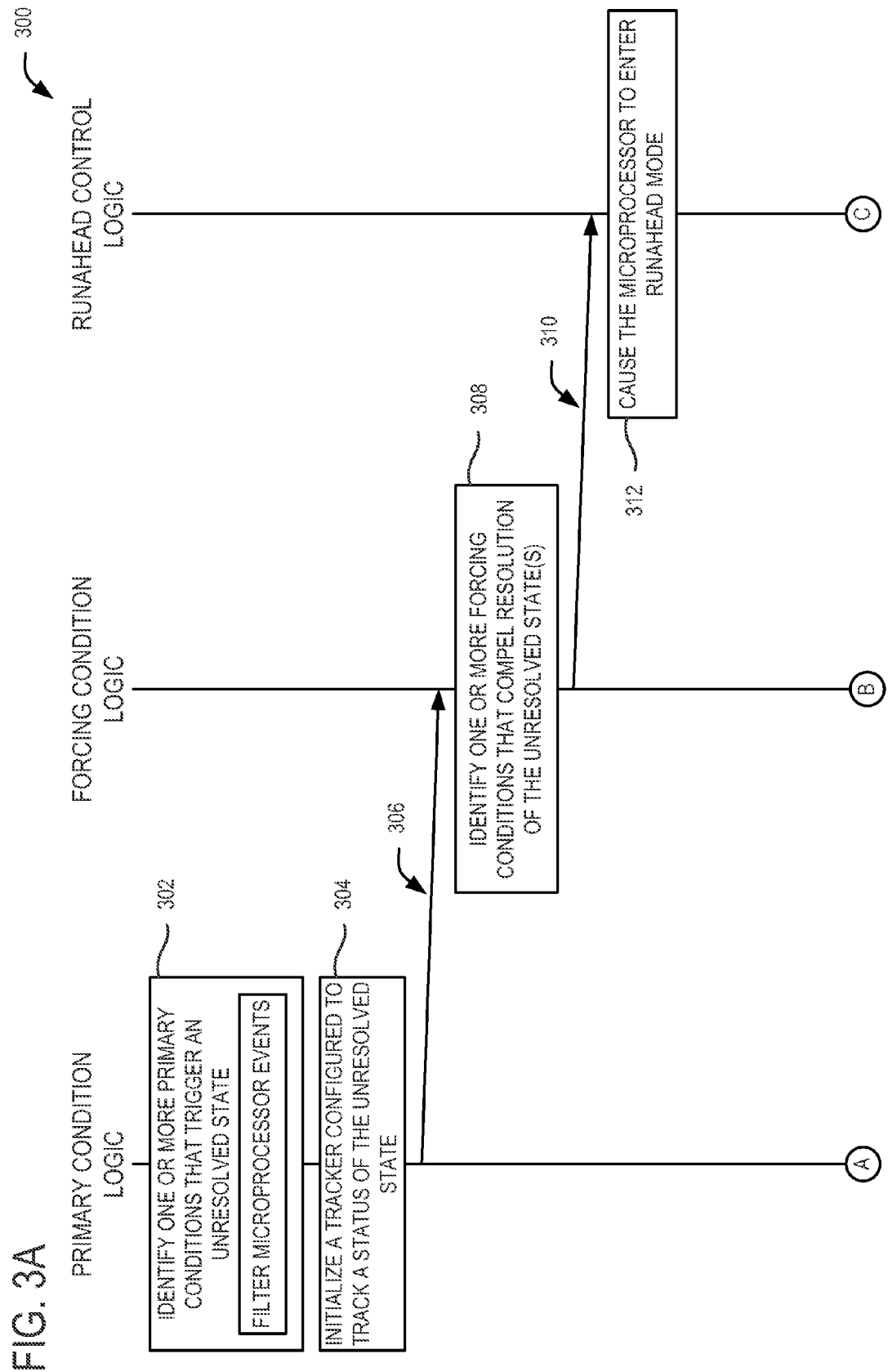
FIG. 3A shows a portion of a method for entering runahead in a lazy fashion according to an embodiment of the present disclosure.
Figure 3B:
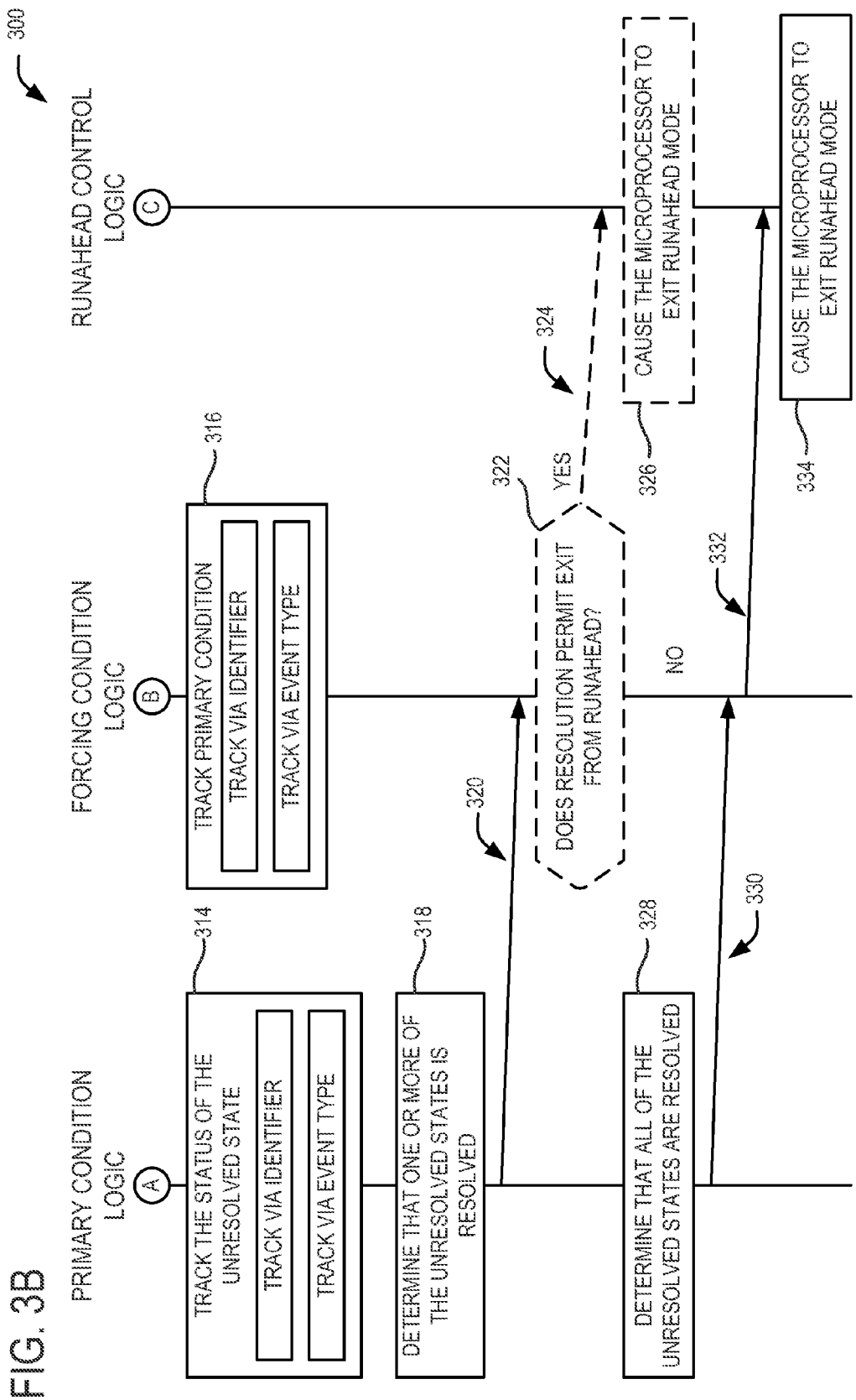
FIG. 3B shows another portion of the method shown in FIG. 3A.

FIGS. 3A and 3B show an embodiment of a method 300 for causing a microprocessor to enter into and operate in runahead in a lazy fashion. It will be appreciated that embodiments of method 300 may be used to operate any suitable microprocessor in runahead without departing from the scope of the present disclosure.

As shown in FIG. 3A, method 300 includes, identifying, at primary condition logic, a primary condition that triggers an unresolved state in the microprocessor at 302. It will be appreciated that any suitable number of primary conditions may be identified. For example, in some embodiments, a plurality of primary conditions may be identified at 302. In some embodiments, identifying the primary condition at 302 may include identifying a primary condition type associated with the primary condition. For example, the primary condition logic may identify the primary condition as being store miss type in one scenario. Identifying the type of primary condition may assist with tracking the source of the primary condition in embodiments where the primary condition logic identifies and tracks more than one primary condition concurrently.

In some embodiments, identifying the primary condition at 302 may include filtering microprocessor events according to one or more predetermined unresolved state triggering events. By filtering the events, the microprocessor may be able to discriminate among various types of events that may lead to stalls later on and identify a particular microprocessor event associated with a selected primary condition. For example, a plurality of microprocessor events may be filtered according to a lazy runahead policy that includes predetermined events related to respective primary conditions. In one scenario, a lazy runahead policy may include filtering criteria configured to ignore prefetch store misses and capture share-permission store misses. Upon the occurrence of an unpermitted store event at a cache location, the primary condition logic may determine that a share-permission store miss primary condition has occurred.

Upon identification of the primary condition, method 300 includes, at 304, initializing a tracker configured to track a status of the unresolved state. For example, the primary condition logic may set an active status bit that indicates whether the primary condition is unresolved. In some embodiments, the primary condition logic may track the primary condition by an event type and/or a primary condition identifier.

Once the primary condition has been identified, method 300 includes, at 306, sending a primary condition signal indicating the occurrence of the primary condition from the primary condition logic to forcing condition logic configured to identify the forcing condition and, at the forcing condition logic, collecting one or more primary condition signals received from the primary condition logic. In some embodiments, the primary condition signal may include status information about the primary condition (e.g., whether the primary condition is resolved). For example, the primary condition logic may enable a primary condition signal to the forcing condition logic while the primary condition is unresolved and disable the primary condition signal upon resolution of the primary condition. It will be appreciated that, when sent, the primary condition signal may be updated and/or transmitted continuously or at any suitable interval without departing from the scope of the present disclosure.

Additionally, in some embodiments, the signal may include information about the primary condition, such as an event type and/or a primary condition identifier that may be used to match a particular primary condition to a forcing condition associated with that primary condition. For example, a transaction identifier associated with a store miss event may be used to match the primary condition for that store miss event to a forcing condition. As another example, a store miss type (e.g., unavailable vs. permission upgrade) may be used to match the associated primary condition with a forcing condition.

At 308, method 300 includes, at the forcing condition logic, identifying a forcing condition that compels resolution of an unresolved state associated with a particular primary condition. Identification of the forcing condition may be performed based on any suitable criteria for associating one or more primary conditions with a forcing condition that compels resolution of those primary conditions. In some embodiments, the forcing condition may be identified according to primary condition identifier and/or event type information as described above.

In some embodiments, identifying the forcing condition at 308 may include filtering microprocessor events according to one or more predetermined forcing condition events. By filtering the microprocessor events, the forcing condition logic may discriminate among various microprocessor events that may lead to a stall if the primary condition(s) associated with those events is unresolved. For example, a plurality of microprocessor events may be filtered according to a lazy runahead policy comprising filtering criteria configured to identify a forcing condition. In one scenario, a forcing condition may be identified when a barrier event that will cause the microprocessor to stall if a share-permission store miss primary condition is unresolved.

It will be appreciated that any suitable number of forcing conditions may be identified that are associated with respective primary conditions. For example, another forcing condition related to an unresolved state triggered by another primary condition may be identified, where the other forcing condition compels resolution of the other primary condition.

Upon the occurrence of the forcing condition and the existence of one or more unresolved primary conditions associated with that forcing condition (e.g., one or more primary conditions for which the forcing condition compels resolution to continue normal operation of the microprocessor), the microprocessor may enter runahead. Thus, at 310, method 300 includes, in response to the occurrence of the forcing condition and the unresolved status of the one or more primary conditions associated with that forcing condition, sending a runahead control signal to the runahead control logic. In response, method 300 includes, at 312, causing the microprocessor to enter into a runahead mode responsive to identification of the forcing condition.

Turning to FIG. 3B, method 300 includes, at 314, tracking the status of the unresolved state associated with a particular primary condition at the primary condition logic. In some embodiments, the unresolved state for a given primary condition may be tracked according to a primary condition identifier and/or a primary condition type. For example, a transaction identifier associated with a store miss may be associated to a preselected value upon resolution of the store miss, so that the value associated with the transaction identifier can be used to determine resolution of the unresolved state and the identifier may be used to distinguish that specific primary condition from other primary conditions that may remain unresolved. By tracking the status using an identifier, the primary condition logic may update the forcing condition logic about the status of the unresolved state triggered by the particular primary condition associated with that identifier. In turn, the forcing condition logic may make determinations about whether to exit runahead at the transaction level.

As another example, a value associated with a store miss type of primary condition may be adjusted in response to resolution of the store miss, so that the value may be used to determine resolution and the type may be used to distinguish resolution of one type of primary condition from other types of primary conditions. In some embodiments, such a value may be adjusted by a counter that may track more than one type of primary condition concurrently. For example, the occurrence of a store miss may cause the counter to increase the value, while the resolution of a store miss causes the counter to decrease the value. The primary condition signal sent to the forcing condition logic may include the value and updates to the value. In turn, the occurrence of a forcing condition related to a store miss type of primary condition while the value is greater than zero may cause the microprocessor to enter runahead, while the occurrence of a forcing condition while the value is zero would not. While this approach may not provide detail at the memory transaction-level granularity to the forcing condition logic, it may provide type-specific detail while conserving memory within the primary condition logic.

In some embodiments where a single forcing condition logic subsystem receives information about more than one type of primary condition from a single primary condition logic subsystem, the forcing condition logic subsystem may track the status of the underlying primary conditions. Thus, in some of such embodiments, method 300 may include, at 316, tracking the primary condition at the forcing condition logic. In some of such embodiments, the primary condition may be tracked using the status of the signal received from the primary condition logic. For example, resolution of one or more primary conditions may cause respective primary condition signals to be de-asserted. In some of such embodiments, the primary condition may be tracked according to a primary condition identifier or a primary condition type.

At 318, method 300 includes determining a resolution of one or more of the unresolved states at the primary condition logic, and, at 320, signaling the forcing control logic that those primary conditions have been resolved. For example, upon the resolution of a store miss, the primary condition logic may signal the forcing condition logic that the store miss condition has been resolved by de-asserting the primary condition signal to the forcing condition logic.

In some embodiments, method 300 may include, at 322, determining whether resolution of those primary conditions permits the microprocessor to exit runahead. This may permit exit from runahead upon the resolution of at least one of a plurality of unresolved states, potentially allowing an early exit from runahead. It will be appreciated that such determinations may be based upon any suitable criteria, including primary condition type, order of occurrence, and so on. For example, if a store miss primary condition is resolved even though a long-latency square root operation primary condition remains unresolved, the forcing condition logic may determine that the microprocessor may exit runahead. If the forcing control logic determines that the microprocessor may exit runahead, method 300 comprises sending a signal from the forcing control logic to the runahead control logic that the microprocessor may exit runahead at 324. In some embodiments, sending the signal may include signaling the runahead control logic that the unresolved state has been resolved. At 326, method 300 includes causing the microprocessor to exit runahead mode. If it is judged that the microprocessor is to remain in runahead despite the resolution of the one or more unresolved, the microprocessor remains in runahead.

It will be appreciated that, in some embodiments, the microprocessor may remain in runahead even after resolution of one of a plurality of unresolved states. This may provide an approach to extend runahead operation. Decisions to extend runahead operation may be based on any suitable criteria, such as primary condition type. In some embodiments, a decision to extend runahead operation may include consideration of the occurrence of conditions during runahead that might trigger runahead. For example, if runahead operation uncovers a branch mispredicts or a cache load miss, runahead operation may be extended until such conditions are resolved. As another example, a primary condition may occur during non-runahead operation while a forcing condition related to that primary condition may be encountered during runahead operation. As yet another example, a primary condition and a forcing condition related to that primary condition may be initiated during non-runahead operation, but detection of long-latency nature of the primary condition may not occur until the microprocessor is in runahead operation. In such examples, runahead may be extended until the underlying primary condition is resolved.

Once all of the unresolved states have been resolved, the microprocessor exits runahead. In the embodiment shown in FIG. 3B, method 300 includes, at 328, determining at the primary control logic that all of the unresolved states are resolved and, at 330, sending a signal to the forcing control logic that all of the unresolved states are resolved. At 332, method 300 comprises, at the forcing control logic, sending a signal to the runahead control logic that the microprocessor may exit runahead. In some embodiments, sending the signal may include signaling the runahead control logic that the unresolved state has been resolved. At 334, method 300 includes causing the microprocessor to exit runahead mode.

It will be appreciated that methods described herein are provided for illustrative purposes only and are not intended to be limiting. Accordingly, it will be appreciated that in some embodiments the methods described herein may include additional or alternative processes, while in some embodiments, the methods described herein may include some processes that may be reordered or omitted without departing from the scope of the present disclosure. Further, it will be appreciated that the methods described herein may be performed using any suitable hardware including the hardware described herein.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. A method of operating a microprocessor, the method comprising:
   while in a normal mode of operation, identifying a primary condition that triggers an unresolved state of the microprocessor, wherein said microprocessor remains in said normal operation mode responsive to said identifying said primary condition;
   identifying a forcing condition that compels resolution of the unresolved state; and
   causing the microprocessor to enter into a runahead mode responsive to identification of the forcing condition.

2. The method of claim 1, further comprising, at primary condition logic configured to identify the primary condition:
   identifying the primary condition by filtering microprocessor events according to one or more predetermined unresolved state triggering events to identify a particular microprocessor event associated with the primary condition;
   upon identifying the primary condition, initializing a tracker configured to track a status of the unresolved state; and
   signaling the status of the unresolved state to forcing condition logic configured to identify the forcing condition.

3. The method of claim 2, further comprising tracking the status of the unresolved state using a primary condition identifier associated with the primary condition.

4. The method of claim 2, further comprising tracking a primary condition type associated with the primary condition.

5. The method of claim 2, further comprising identifying a primary condition type associated with the primary condition.

6. The method of claim 1, further comprising:
   determining a resolution of the unresolved state; and
   signaling runahead control logic configured to control runahead operation of the resolution of the unresolved state.

7. The method of claim 6, further comprising exiting from the runahead mode upon resolution of the unresolved state triggered by the primary condition.

8. The method of claim 6, further comprising:
   identifying another primary condition that triggers another unresolved state in the microprocessor; and
   exiting from the runahead mode upon resolution of at least one of the unresolved states.

9. The method of claim 6, further comprising:
identifying another primary condition that triggers another unresolved state in the microprocessor; and
exiting from the runahead mode upon resolution of all of the unresolved states.

10. The method of claim 9, further comprising:
identifying another forcing condition, where the other forcing condition compels resolution of the other unresolved state triggered by the other primary condition prior to exit from runahead.

11. The method of claim 9, further comprising:
identifying another forcing condition, the other forcing condition being related to the unresolved state triggered by the other primary condition; and exiting from the runahead mode upon resolution of at least one of the unresolved states.

12. A microprocessor for executing an instruction retrieved by fetch logic and scheduled for execution by scheduling logic, the microprocessor comprising:
primary condition logic configured to identify, during normal operation, a primary condition that triggers an unresolved state in the microprocessor, wherein said microprocessor remains in said normal operation responsive to said identifying said primary condition;
forcing condition logic in operative communication with the primary condition logic, the forcing condition logic being configured (i) to track the primary condition and (ii) to identify a forcing condition that compels resolution of the unresolved state; and
runahead control logic in operative communication with the forcing condition logic, the runahead control logic being operative to cause the microprocessor to enter a runahead mode upon identification of the forcing condition.

13. The microprocessor of claim 12, where the primary condition logic comprises a register configured to store one of an primary condition identifier for the primary condition, a status for the primary condition logic, or a primary condition type associated with the primary condition.

14. The microprocessor of claim 12, where the primary condition logic is operative to send a primary condition signal to the forcing condition logic based upon identification of the primary condition.

15. The microprocessor of claim 14, where the forcing condition logic is operative to send a runahead signal to the runahead control logic based upon identification of the forcing condition and receipt of the primary condition signal, and where the runahead control logic is operative to cause the microprocessor to enter or exit runahead based upon a status of the runahead signal.

16. The microprocessor of claim 12, further comprising a counter configured to track occurrences of one or more primary conditions, where the runahead control logic is operative to cause the microprocessor to enter runahead based upon a value stored in the counter.

17. The microprocessor of claim 12, where the primary condition logic comprises a plurality of primary condition detectors, each primary condition detector being configured to identify a particular primary condition based upon detection of a respective microprocessor event associated with that primary condition.

18. The microprocessor of claim 12, where the forcing condition logic comprises a plurality of forcing condition detectors, each forcing condition detector being configured to identify a particular forcing condition based upon (i) detection of a respective microprocessor event associated with that forcing condition and (ii) identification of a particular primary condition associated with that forcing condition.

19. A method of operating a microprocessor, comprising exiting a runahead mode of operation by resolving an unresolved state triggered by a primary condition occurring prior to instantiation of the runahead mode, the runahead mode being instantiated responsive to a forcing condition that compels resolution of the unresolved state triggered by the primary condition.

20. The method of claim 19, further comprising: identifying the primary condition by filtering microprocessor events according to one or more predetermined unresolved state triggering events to identify a particular microprocessor event associated with the primary condition; upon identifying the primary condition, initializing a tracker configured to track a status of the unresolved state; identifying the forcing condition by detecting a forcing event associated with that microprocessor event while the status is unresolved; and entering the runahead mode responsive to identification of the forcing condition.

* * * * *